(No Model.) 2 Sheets—Sheet 2.

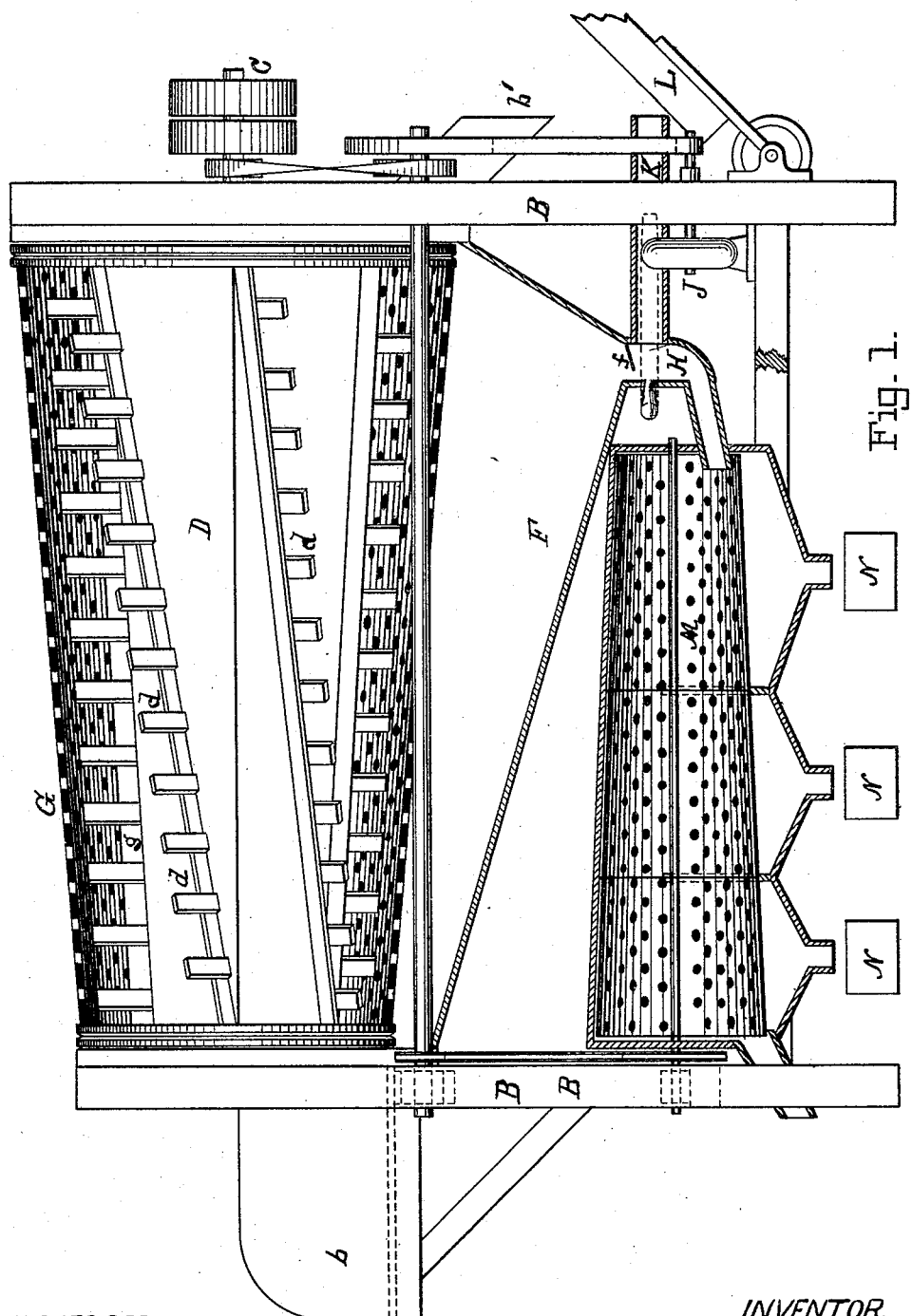

J. H. EMPSON.
PEA HULLER OR SHELLER.

No. 486,441. Patented Nov. 22, 1892.

WITNESSES.

INVENTOR.
John H. Empson
by J. W. Lynton,
atty

UNITED STATES PATENT OFFICE.

JOHN H. EMPSON, OF LONGMONT, COLORADO.

PEA HULLER OR SHELLER.

SPECIFICATION forming part of Letters Patent No. 486,441, dated November 22, 1892.

Application filed March 9, 1892. Serial No. 424,259. (No model.)

*To all whom it may concern:*

Be it known that I, JOHN H. EMPSON, of Longmont, Colorado, have invented new and useful Improvements in Pea Hullers or Shellers, of which the following is a description, reference being had to the accompanying drawings, which form a part of this specification.

The purpose of my invention is to enable me to separate the peas from the vines and from their hulls or pods by an action similar to that which occurs when the shelling is done by hand, and thus to get rid of the excessive force of impact formerly used in machines for shelling peas. At the same time my invention contemplates an apparatus which will gradually increase the force of the action as the vines progress through it, whereby the more resisting pods which pass farther along before being broken open will receive a much stronger action, a means for causing the vines to be thoroughly overturned during their passage through the apparatus, together with means for conveying away the waste materials and the chaff, and a separator or distributer for the peas as they issue from the machine.

To these ends my invention consists of a method of successively subjecting the pods to blows and pressure, and apparatus constructed, arranged, combined, and used, substantially as hereinafter set forth.

Figure 3:
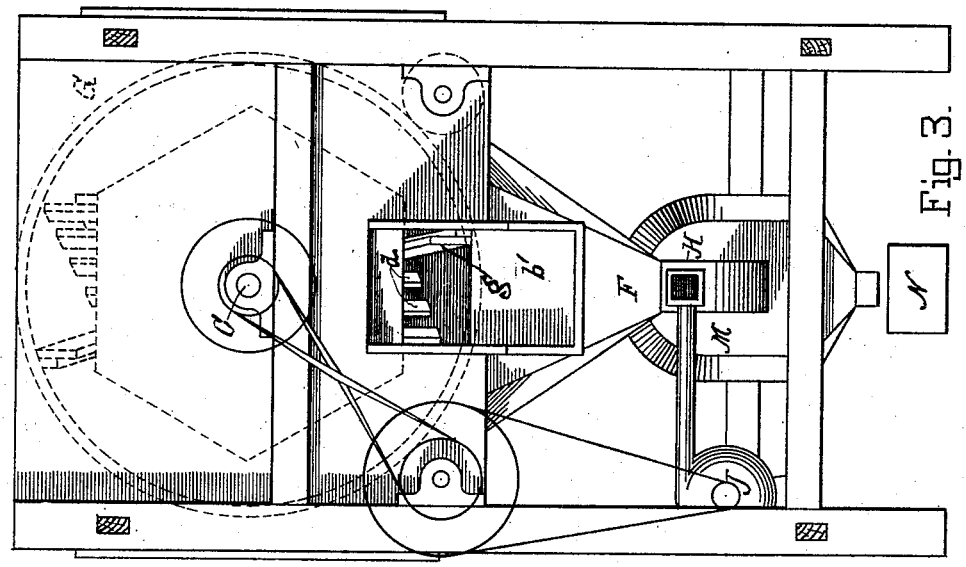
Figure 4:
Figure 5:
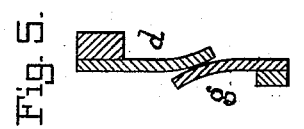
Figure 2:
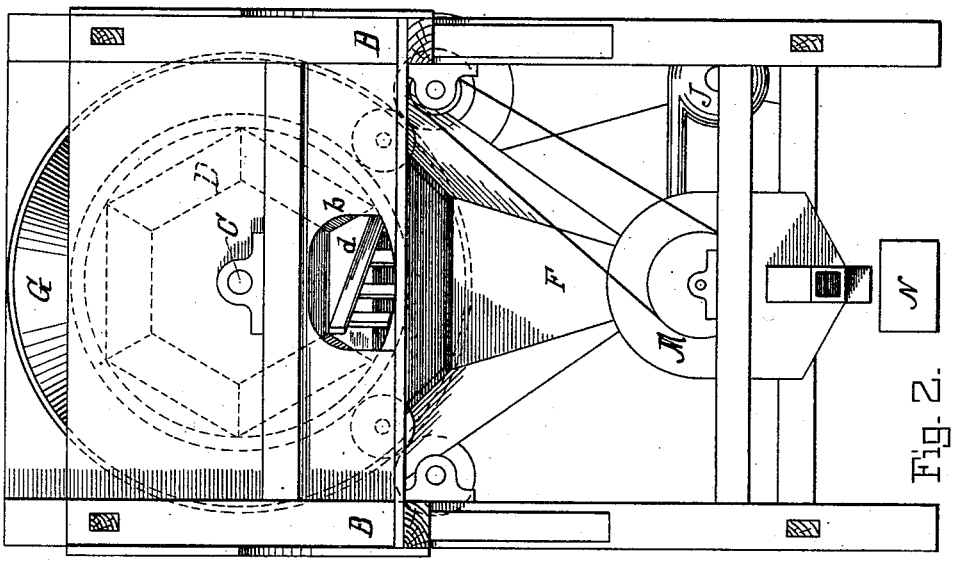

In the accompanying drawings, Figure 1 is a side elevation, partly in section, of one embodiment of my invention. Fig. 2 is an end elevation of the same as viewed from the front. Fig. 3 is a rear elevation of the same. Figs. 4 and 5 are detail views of the blades or paddles by which I carry out my invention.

In the drawings like letters of reference indicate like parts.

At B is shown the frame of my apparatus, $b$ indicating the chute through which the vines are introduced, and $b'$ the chute out of which they pass from the thrashing mechanism.

At C is shown the driving-shaft and pulleys of my device.

The thrasher consists of an inner pyramidal drum D, mounted upon the shaft C, and a surrounding shell of conical form constructed of leather, rubber, or other substance, and provided with perforations for permitting the shelled peas to pass down into the hopper F. This outer shell may be mounted upon rollers, as indicated, and driven by means of cord or belting. I have shown pulley-grooves for this at each end of the shell. The inner drum or frame D carries upon its surface flexible and elastic blades or paddles $d$, preferably of rubber, as indicated in detail in Figs. 4 and 5. These blades or paddles may be made of comparatively-narrow fingers after the manner of a comb and set in diagonal rows upon the inner drum, that they may successively come into contact with the opposing paddles. The outer shell G carries these opposing and cooperating blades or paddles $g$, also preferably flexible and elastic. These paddles may be made of strips extending the whole length of the shell instead of being subdivided, as are the others. Both the inner frame or drum D and the outer shell or drum G rotate either in the same or opposite directions; but the speed of the inner drum is much greater and brings the paddles upon its surface successively against the co-operating paddles of the outer drum. The conical and pyramidal shapes of my rotary parts cause the vines and pods to receive a much greater blow at the larger end of the thrasher, for at these points the paddles are farther removed from the axis of motion and strike against each other with greater velocity and greater force. At this end of the thrasher, also, the space between the inner and outer drums is somewhat greater than at the small end, and thereby the travel of the vines toward the larger end and toward the waste-chute $b'$ is greatly facilitated. The rotation of the outer drum G not only causes the vines to be thoroughly overturned in their passage through the machine, but also greatly aids in dropping the peas through the perforations in its surface.

I will now describe the action of my flexible and elastice blades or paddles, whereby my improved method of shelling peas may be carried out. In Fig. 4 is shown the position of impact face to face of a pair of co-operating blades or paddles. At this phase of the action the pods or vines that may happen to be between such blades or paddles are struck a sharp blow between the opposing faces of the paddles. As the drums rotate the paddles are pressed backward, as shown in Fig. 5, and begin to slip upon each other or upon the body which may be between them. Further movement causes a rolling and shearing action between the blades or paddles not unlike that between the fingers in the action of shelling peas by hand. Finally, the paddles slip by each other and spring forward from their bent position to again come in contact with succeeding co-operating blades or paddles. It will be seen that by this action I subject the pods to a blow, a pressure, and a rolling shearing force. This I consider a great improvement in the art of shelling peas by machinery, as it lessens the liability of pods passing through the machine unbroken and greatly reduces the force of the blows to which the peas must otherwise be subjected in order to free them from the pods. As the peas fall from the pods and pass through the perforations in the outer shell into the hopper F they are carried to the chute H at the bottom of the hopper. As they pass into the chute they encounter the deflecting-plate $f$ that throws them to one side of the chute directly against—i. e., toward the side at which enters the blast or suction of air from a blower J. The chaff is thereby blown from the falling peas through the waste-pipe K into the waste receiver or conveyer L.

At M is shown a distributer or sorting device of the well-known conical type, from which the peas fall properly distributed accorbing to size into the receivers N.

It must of course be understood that many other forms of distributing or sorting devices may be used in my apparatus for sizing the peas. So, also, many forms of suction-fan or blower may be used and the arrangement of parts considerably modified without in any way departing from the principles of my invention.

While it is true that it is not essential to my improved method or art of shelling peas by machinery that both the paddles of each co-operating pair should be flexible it is very much better to so construct them, and I have therefore shown no other form; but, Having now fully set forth one form of my invention and the manner in which my improvement in the art may be used, I claim, broadly, as my own and desire to secure by these Letters Patent the following:

1. In combination, in an apparatus for shelling peas, an outer shell or drum provided with flexible elastic blades or paddles, preferably of rubber, an inner frame or drum provided with similar blades or paddles arranged to strike against the first said blades or paddles, and means for rotating one or both the said drums, substantially as and for the purpose set forth.

2. In combination, in an apparatus for shelling peas, a conical shell or drum provided with blades or paddles, and a frame or drum within the said shell provided with co-operating blades or paddles, arranged to strike face to face against the first said paddles, substantially as and for the purposes set forth.

3. In combination, in an apparatus for shelling peas, an outer shell or drum provided with blades or paddles, and a relatively-moving inner drum or frame provided with blades or paddles arranged to strike face to face against the first said blades or paddles, the line of action at one end of the said drums being further removed from the axis of motion than at the other end, substantially as and for the purposes set forth.

4. In combination with the relatively-moving parts of a pea-sheller or like apparatus, one or more pairs of co-operating blades or paddles carried by the said parts and arranged to strike face to face against each other, one at least of the blades or paddles of each of the said pairs being of elastic material, substantially as and for the purposes set forth.

5. The improvement in the art of shelling peas by machinery, which consists in subjecting the pods and vines successively to the striking pressure of impinging bodies and to a rolling and shearing action between such bodies, substantially as and for the purposes set forth.

6. The improvement in the art of shelling peas by machinery, which consists in subjecting the pods and vines to blows and pressure between two impinging bodies, substantially as and for the purposes set forth.

In witness whereof I have hereunto set my hand this 24th day of February, 1892.

JOHN H. EMPSON.

Witnesses:
LEWIS SEARING,
FRANK E. SHEPARD.